(12) United States Patent
Wilds

(10) Patent No.: US 8,631,904 B1
(45) Date of Patent: *Jan. 21, 2014

(54) TREE STAND STEP

(71) Applicant: William F. Wilds, North Scituate, RI (US)

(72) Inventor: William F. Wilds, North Scituate, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/674,355

(22) Filed: Nov. 12, 2012

Related U.S. Application Data

(63) Continuation-in-part of application No. 13/419,915, filed on Mar. 14, 2012.

(51) Int. Cl.
E06C 7/16 (2006.01)

(52) U.S. Cl.
CPC .......................................... E06C 7/16 (2013.01)
USPC .............................. 182/116; 182/120; 182/122

(58) Field of Classification Search
USPC ............. 182/53–55, 57–62, 90, 92, 115, 116, 182/120–122
See application file for complete search history.

(56) References Cited

U.S. PATENT DOCUMENTS

| | | | | |
|---|---|---|---|---|
| 2,174,891 A * | 10/1939 | Maran | ........................... | 182/121 |
| 2,709,626 A * | 5/1955 | Woodburn | ..................... | 182/121 |
| 2,772,927 A * | 12/1956 | Woodward | ..................... | 182/121 |
| 2,871,067 A * | 1/1959 | Brogdon | ........................ | 182/121 |
| 3,710,894 A * | 1/1973 | O'Dell | ........................... | 182/106 |
| 3,797,607 A * | 3/1974 | Gargasz | ........................... | 182/82 |
| 3,837,427 A * | 9/1974 | Mattinson | ..................... | 182/115 |
| 3,870,124 A * | 3/1975 | Howard | ....................... | 182/178.5 |
| 4,134,474 A * | 1/1979 | Stavenau et al. | ............... | 182/187 |
| 4,189,029 A * | 2/1980 | Jordan | ......................... | 182/186.9 |
| 4,212,371 A * | 7/1980 | Gaviorno, Jr. | ................ | 182/121 |
| 4,303,145 A * | 12/1981 | Vazquez | ........................ | 182/122 |
| 4,425,985 A * | 1/1984 | Geisel et al. | ................... | 182/121 |
| 4,450,935 A * | 5/1984 | Gustavus | ......................... | 182/45 |
| 4,586,586 A * | 5/1986 | Canals | ........................... | 182/118 |
| 4,869,520 A * | 9/1989 | Cole | ........................... | 280/164.1 |
| 4,953,661 A * | 9/1990 | Hilton et al. | ................... | 182/120 |
| 5,052,515 A * | 10/1991 | Nowlan | ......................... | 182/121 |
| 5,060,755 A * | 10/1991 | Bourdages et al. | ............ | 182/121 |
| 5,072,808 A * | 12/1991 | Spalt et al. | ..................... | 182/103 |
| 5,927,435 A * | 7/1999 | Benton | ........................... | 182/116 |
| 6,883,644 B1 * | 4/2005 | Braun et al. | ................... | 182/187 |
| 7,210,558 B2 * | 5/2007 | Eaves | ............................. | 182/115 |
| 7,735,606 B1 * | 6/2010 | Norton | ....................... | 182/186.9 |
| 7,861,826 B2 * | 1/2011 | Meyers et al. | ................. | 182/121 |
| 2007/0256892 A1 * | 11/2007 | Breedlove, Sr. | .............. | 182/116 |

* cited by examiner

Primary Examiner — Alvin Chin Shue
Assistant Examiner — Colleen M Chavchavadze
(74) Attorney, Agent, or Firm — Salter & Michaelson

(57) ABSTRACT

A step for use in association with a tree stand ladder. The step includes a frame that includes a plurality of elongated members that are formed into a rectangular or square form; a first pair of said elongated members extending substantially in parallel with each other and each having extending free ends; two holding pieces secured at the end of respective free ends of the pair elongated members; a planar platform secured within the frame to enable a person to stand on the platform and a pair side braces that extend from respective elongated members to respective ladder rails to provide support for said frame and planar platform.

13 Claims, 8 Drawing Sheets

TREE STAND STEP

RELATED CASE

This application is a continuation-in-part (CIP) of U.S. Ser. No. 13/419,915 filed on Mar. 14, 2012 and which is incorporated by reference herein in its entirety.

FIELD OF THE INVENTION

The present invention relates in general to a step used on a tree stand. More particularly, the present invention is also concerned with providing a step in combination with a single person tree ladder stand.

BACKGROUND OF THE INVENTION

One typical tree stand is comprised of a frame structure with at least one single fixed step that the hunter can stand or sit on. A ladder is typically used for providing access to the tree stand. Existing tree stands do not allow a hunter to shoot in all directions as the arrangement of an existing tree stand does not allow the hunter to point in multiple directions. Thus, the conventional tree stand does not allow the hunter to shoot behind or off to the side of the shooting hand.

Accordingly, it is an object of the present invention to provide a tree stand step that enhances the use of the tree stand and enables a full 360 degree field of view of the surrounding terrain.

Still another object of the present invention is to provide a tree stand step, in which the step is portable, lightweight and readily engaged with the ladder associated with the tree stand.

Still another object of the present invention is to provide a tree stand step that enables either a right-handed or left-handed shooter to safely aim in all directions.

SUMMARY OF THE INVENTION

To accomplish the foregoing and other objects, features and advantages of the present invention there is provided a step for use in association with a tree stand ladder. The step comprises a frame that includes a plurality of elongated members that are formed into a rectangular or square form; a first pair of said elongated members extending substantially in parallel with each other and each having extending free ends; and two holding pieces secured at the end of respective free ends of the pair elongated members. The holding pieces each extend substantially transverse to each respective elongated member and for engagement with rungs of the tree stand ladder. The step further includes a planar platform secured within the frame to enable a person to stand on the platform and a pair side braces that extend from respective elongated members to respective ladder rails to provide support for said frame and planar platform.

In accordance with other aspects of the present invention the frame also includes a second pair of said elongated members that extend respectively transverse to and connect with the first pair of elongated members; one of said second pair of elongated members has ends thereof which connect with the first pair of elongated members spaced from and defining the extending free ends; the other of the second pair of elongated members is formed integrally with the first pair of elongated members by means of corner curved sections; each of the elongated members is formed with a hollow steel box construct; the holding pieces are each a pin that extends substantially transverse to each respective elongated member; the planar platform is formed by a metal sheet; the metal sheet is in the form of a steel sheet formed with openings; the formed openings are diamond shaped; the side braces each form a diagonal brace having a planar section attached to the elongated member and a support section that is urged against a ladder rail; and the support section is formed as an open U-shaped channel that rests against the rail.

In accordance with another version of the invention there is provided a step for use in association with a tree stand ladder. The step comprises a frame that includes a plurality of elongated members that are formed into a rectangular or square form; a first pair of said elongated members extending substantially in parallel with each other and each having extending free ends and two holding pieces secured at the end of respective free ends of the pair elongated member. The holding pieces each extend substantially transverse to each respective elongated member and for engagement with rungs of the tree stand ladder. The step further includes a planar platform secured within the frame to enable a person to stand on the platform and a pair side braces that extend from respective elongated members to respective ladder rails to provide support for said frame and planar platform. The frame also includes a second pair of said elongated members that extend respectively transverse to and connect with the first pair of elongated members. One of said second pair of elongated members has ends thereof which connect with the first pair of elongated members spaced from and defining the extending free ends, and the other of the second pair of elongated members is formed integrally with the first pair of elongated members by means of corner curved sections; the holding pieces are each a pin that extends substantially transverse to each respective elongated member; the planar platform is formed by a metal sheet that is in the form of a steel sheet formed with openings; the side braces each form a diagonal brace having a planar section attached to the elongated member and a support section that is urged against a ladder rail; and the support section is formed as an open U-shaped channel that rests against the rail.

In accordance with still another version of the present invention there is provided a step for use in association with a tree stand ladder. The step comprises a frame that includes a plurality of elongated members that are formed into a rectangular or square form; a first pair of said elongated members extending substantially in parallel with each other and each having extending free ends; and two holding pieces secured at the end of respective free ends of the pair elongated members. The holding pieces each extend substantially transverse to each respective elongated member and for engagement with rungs of the tree stand ladder. The step further includes a planar platform secured within the frame to enable a person to stand on the platform; and a pair side braces that extend from respective elongated members to respective ladder rails to provide support for said frame and planar platform; wherein the frame also includes a second pair of said elongated members that extend respectively transverse to and connect with the first pair of elongated members; one of said second pair of elongated members has ends thereof which connect with the first pair of elongated members spaced from and defining the extending free ends; the other of the second pair of elongated members is formed integrally with the first pair of elongated members by means of corner curved sections; each of the elongated members is formed with a hollow steel box construct; the holding pieces are each a pin that extends substantially transverse to each respective elongated member; the planar platform is formed by a metal sheet; the metal sheet is in the form of a steel sheet formed with openings; the formed openings are diamond shaped; the side braces each form a diagonal brace having a planar section attached to the elongated member and a support section that is urged against a ladder rail; and the support section is formed as an open U-shaped channel that rests against the rail.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
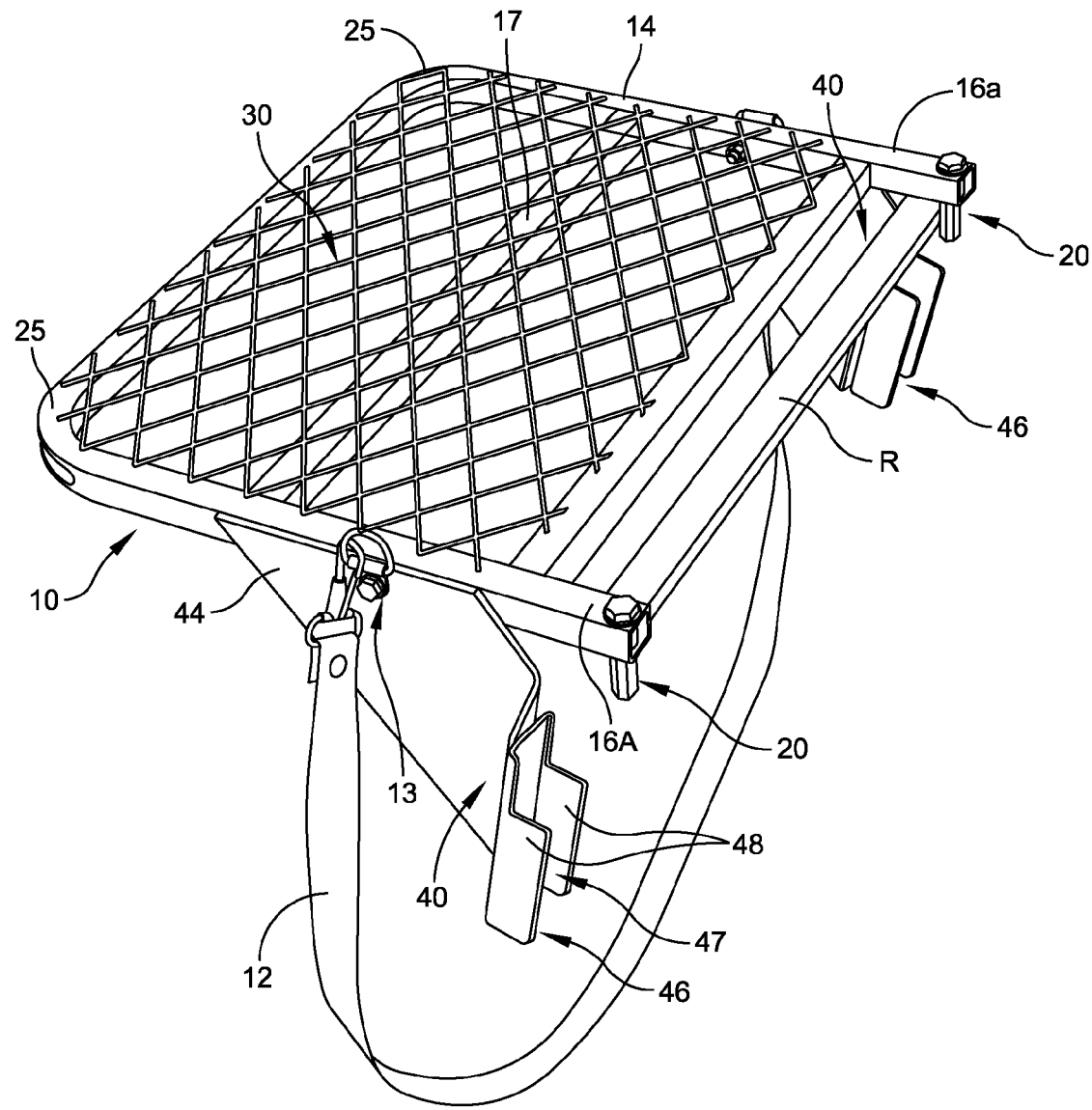
FIG. 1 is a perspective view of one embodiment of the tree stand step of the present invention.
Figure 2:
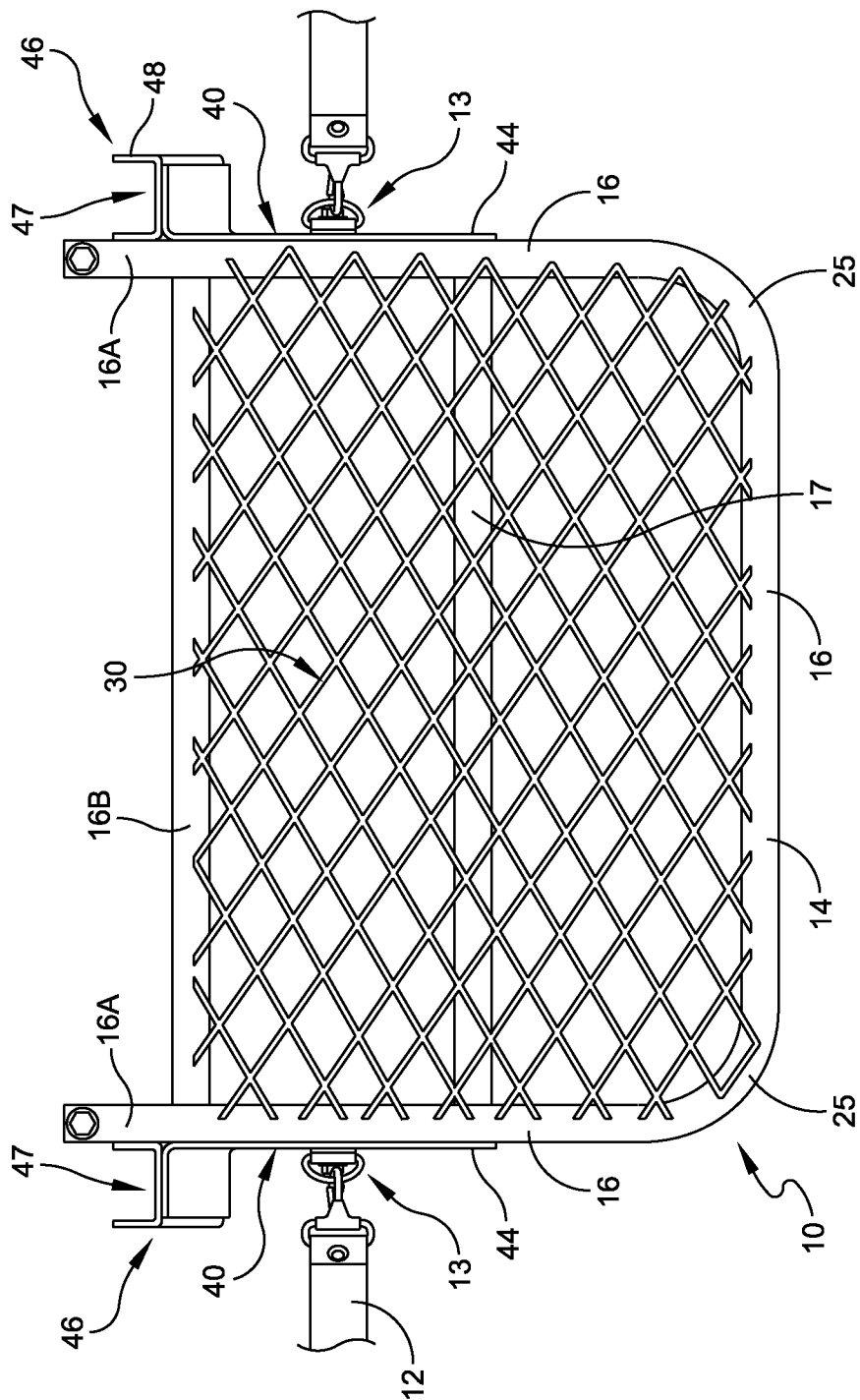
FIG. 2 is a plan view of the tree stand step.
Figure 3:
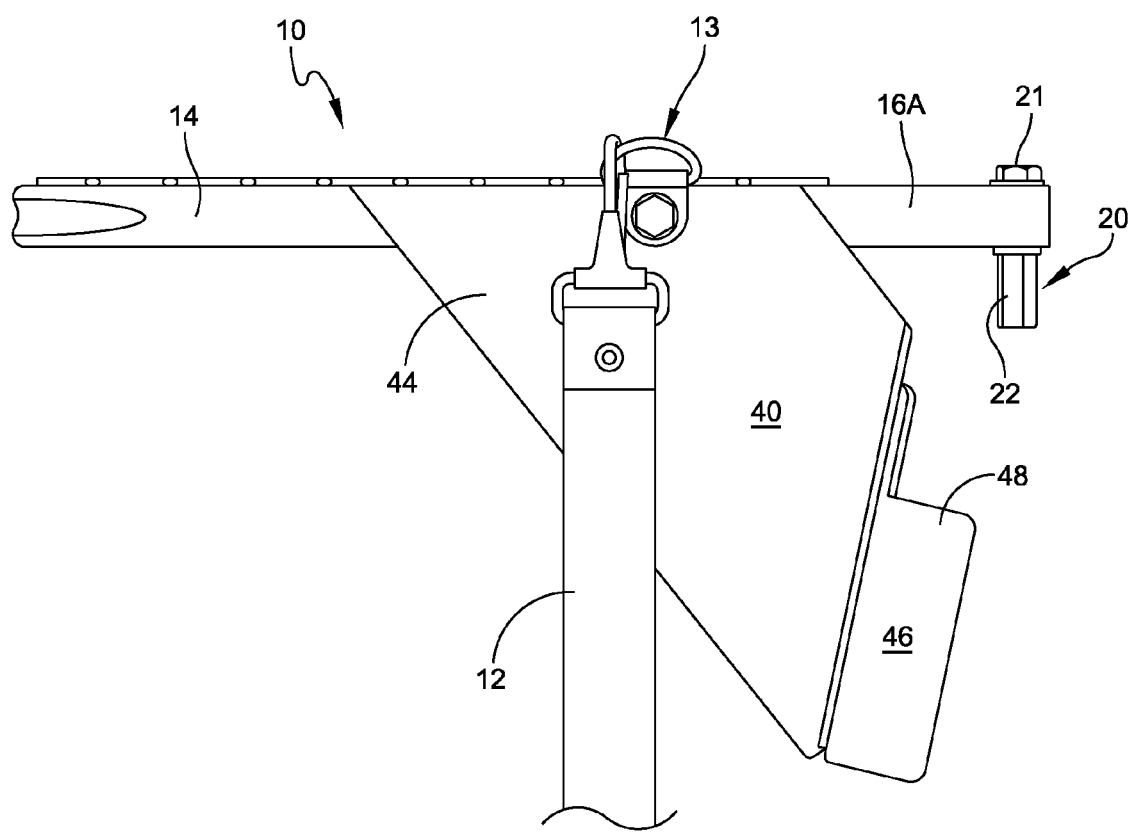
FIG. 3 is a side elevation view of the tree stand step illustrated in FIGS. 1 and 2.
Figure 4:
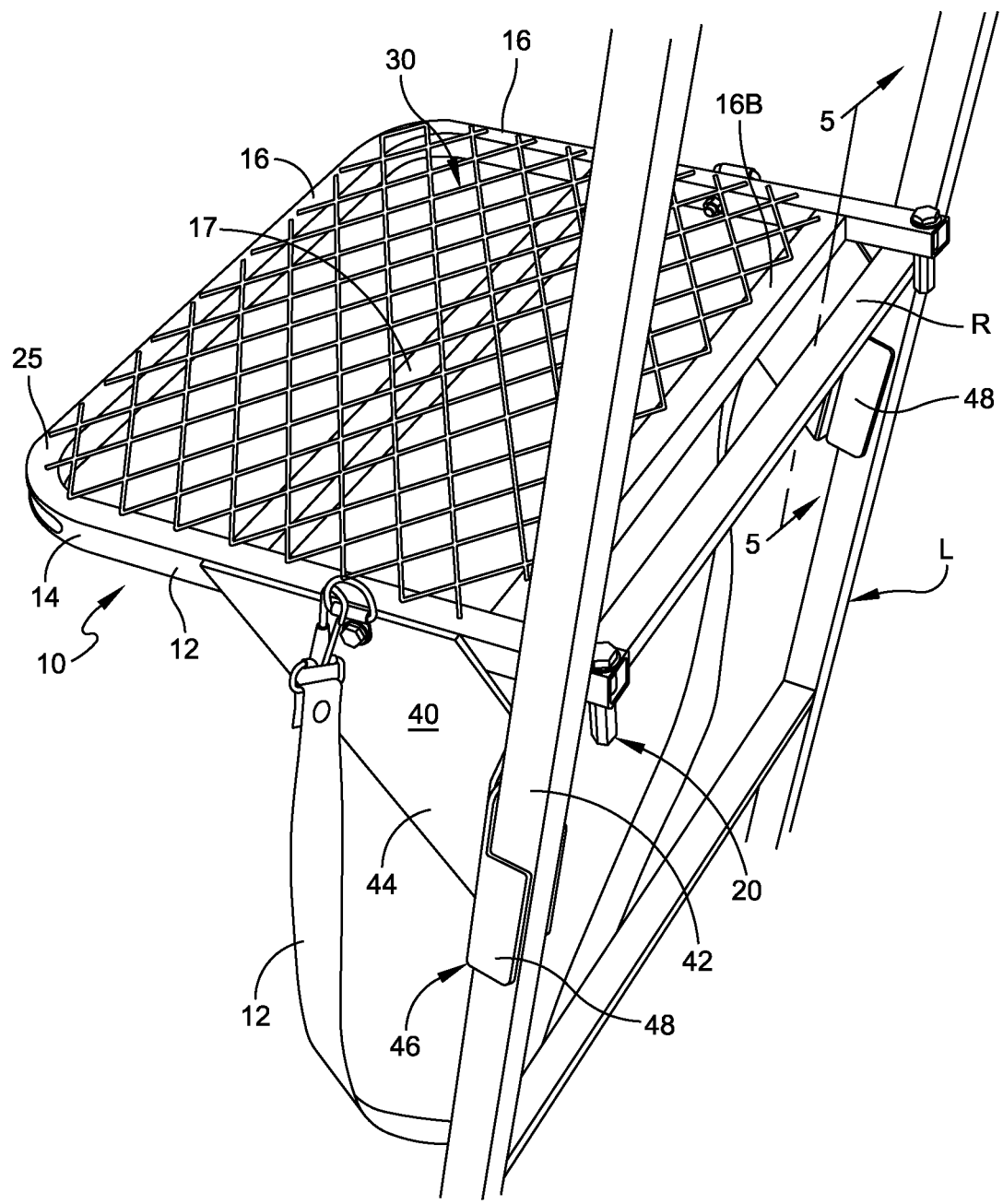
FIG. 4 is a perspective view also illustrating the manner in which the tree stand step engages with a ladder associated with the tree stand.
Figure 5:
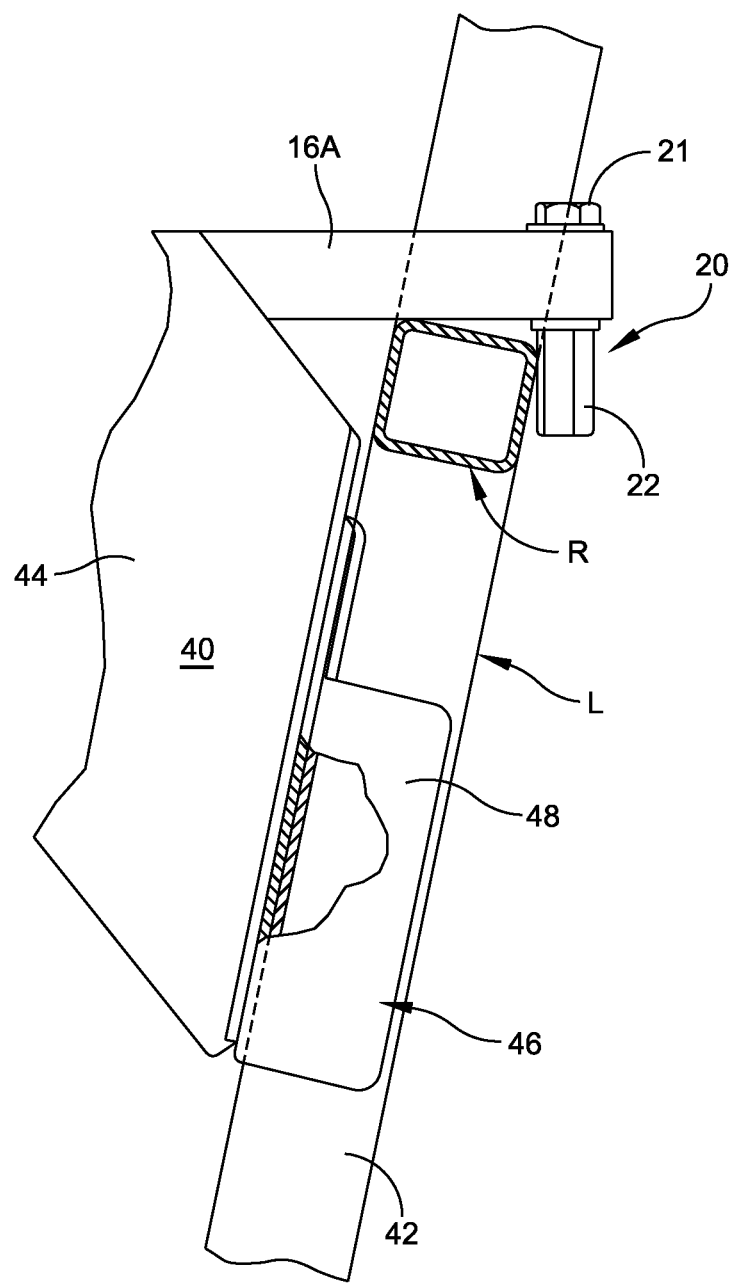
FIG. 5 is a cross-sectional view taken along line 5-5 of FIG. 4.
Figure 6:
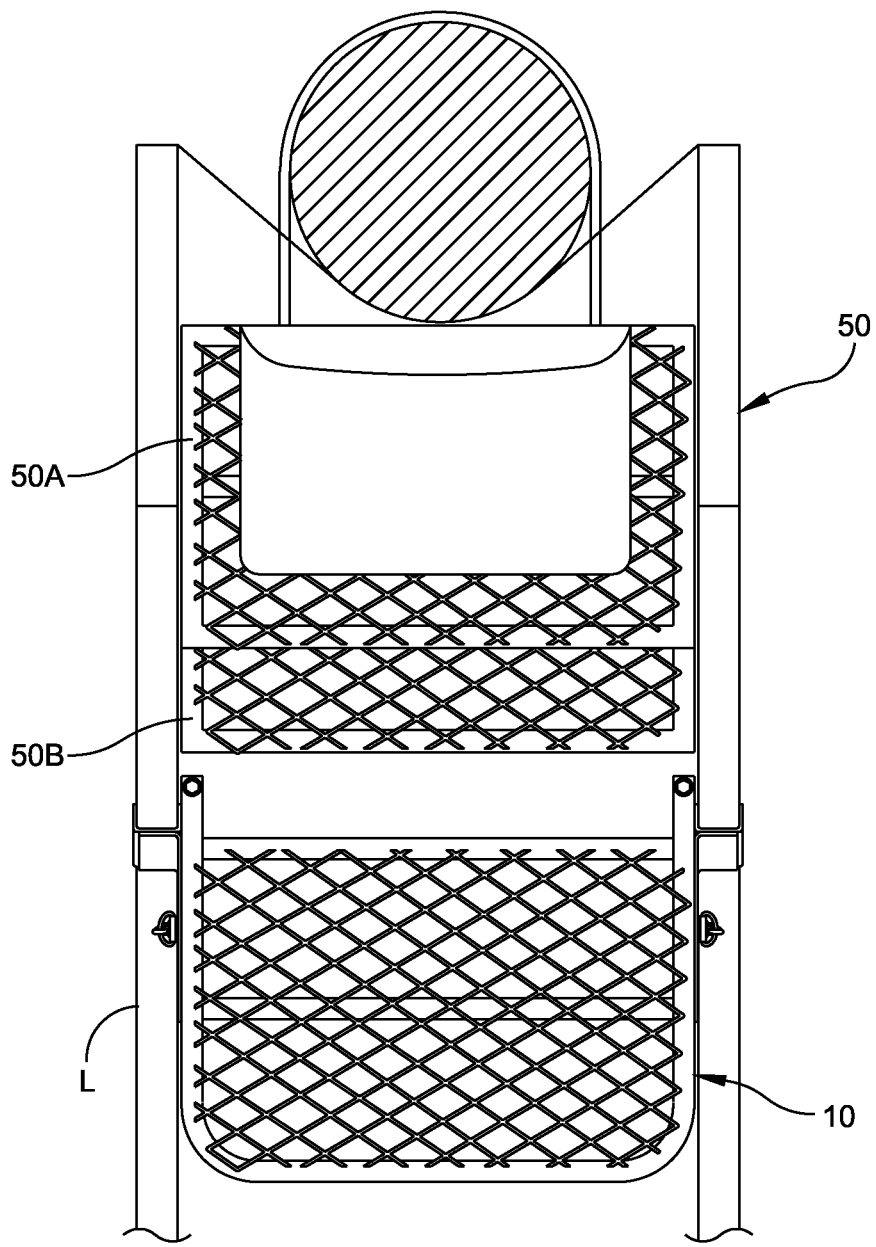
FIG. 6 is a plan view further illustrating the manner in which the tree stand step is associated with the tree stand.
Figure 7:
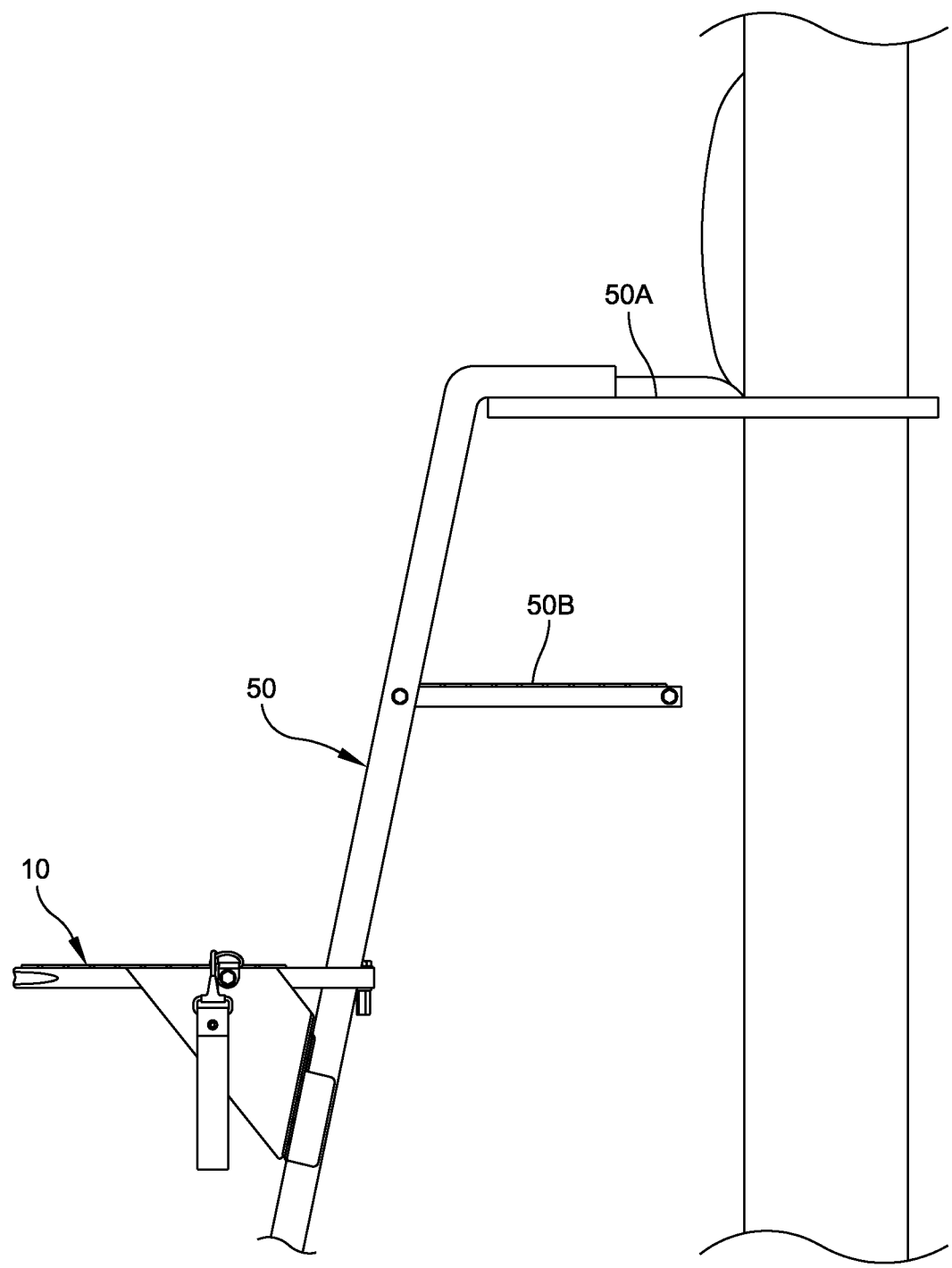
FIG. 7 is a side elevation view in schematic form illustrating the step associated with the tree stand.
Figure 8:
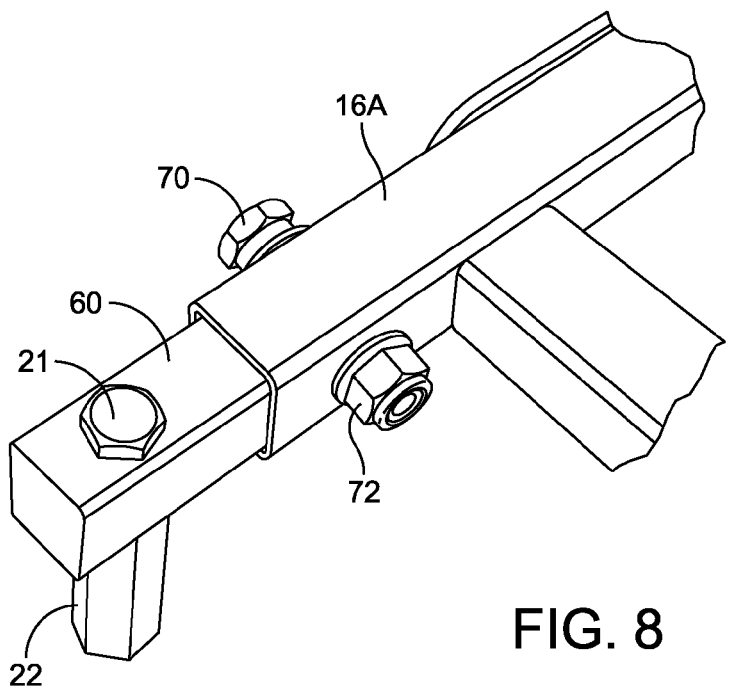
FIG. 8 is a fragmentary perspective view showing an alternate construction in particular at the securing pins.
Figure 9:
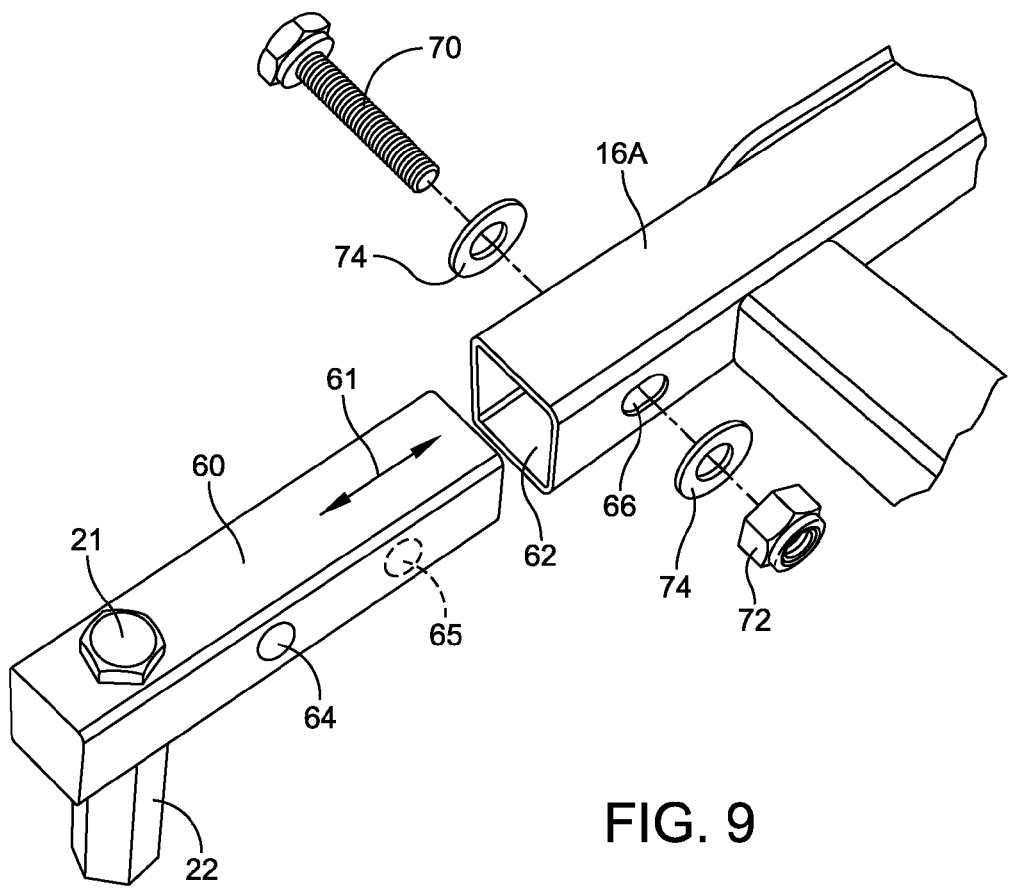
FIG. 9 is an exploded perspective view of the alternate construction of FIG. 8.

Reference is now made to the drawings for an illustration of the novel tree stand step of the present invention. FIGS. 1-3 show details of the step. FIG. 4 illustrates the step as engaged with a ladder of the tree stand. FIG. 5 is a cross-sectional view taken along 5-5 of FIG. 4. FIGS. 6 and 7 illustrate the position of the portable step in association with platforms of the tree stand. The fragmentary perspective views of FIGS. 8 and 9 illustrate an alternate construction.

The step of the present invention is for use in association with a tree stand and in particular is engaged with and is securely positioned on a ladder. In this regard refer to FIG. 4 and the ladder L having a series of rungs R. FIG. 4 illustrates the step 10 of the present invention as supported from one of the rungs R. FIG. 5 is a cross-sectional view taken along line 5-5 of FIG. 4 and also shows the manner in which the step of the present invention is supported from the ladder rung R.

The step 10 of the present invention is portable and preferably includes a strap 12 that can be used for carrying the step 10. The ends of the strap 12 are supported at D-ring mounting plates 13. The ends of the strap are preferably secured in a manner wherein the strap can be easily attached at the mounting ring or removed from the mounting ring. The mounting plates 13 are preferably disposed at the sides of the frame and may extend through the support brackets that are discussed in further detail hereinafter. The strap 12 may be 48 inches long and may be constructed of a polypropylene material. The step 10 can be easily attached to an existing tree stand such as in the schematic illustrations of FIGS. 6 and 7. The use of this supplemental step 10 allows hunters a full 360 degree field of view of the surrounding terrain. The step preferably weighs on the order of seven pounds and thus is easily transported to any existing tree stand. Moreover, the step of the present invention attaches to the ladder of the tree stand with no clamps, bolts or drilling necessary. The step of the present invention allows a hunter, whether left or right handed, to shoot in all directions and in a safe manner.

The step of the present invention is comprised of a frame 14 that includes a plurality of elongated members 16 that are formed into a generally rectangular or square form as illustrated in the drawings. A first pair of these elongated members extends substantially in parallel with each other and each have extending free ends 16A. Each of the elongated members 16 may be constructed of a hollow box channel.

The free ends 16A of a first pair of elongated members 16 support respective holding pieces 20. Each of these holding pieces are secured at these free ends and each are comprised of a pin that extends substantially transverse to each respective elongated member. Each of these pins 20 may be constructed by using a hex head cap screw of grade 8 steel along with a hex female threaded standoff which may be of zinc-plated steel. FIG. 3 shows the cap screw at 21 and the standoff at 22. FIGS. 3 and 5 also illustrate the manner in which the pin or holding piece extends transverse to the elongated axis of the elongated member.

In addition to the first pair of elongated members, there is also provided a second pair of elongated members that extend respectively transverse to and connect with the first pair of elongated members to form the overall frame structure. One of the second pair of elongated members has ends thereof which connect with the first pair of elongated members spaced from and defining the extending free end. This one of the second pair of elongated members is illustrated in the drawings by elongated member 16B. As indicated previously, each of the elongated members is formed with a hollow steel box construction.

The step of the present invention also is comprised of a planar platform 30 that is secured within the frame and enables a person to have a platform upon which to stand. The planar platform is preferably formed of a sheet metal. In the drawings this is illustrated as a grid construction with steel wiring formed with openings. These may be diamond-shaped openings as illustrated. Ends of the platform are secured at each of the elongated frame members. They may be secured by being tack welded thereto or attached in another appropriate manner.

Mention has been made of the elongated members forming the frame. Preferably, at least three of these elongated members are constructed in a U-shape and thus also include interconnecting curbed corners 25. These corners 25 may be formed by bending or may be initially formed in that shape. Also, one additional cross member 17 may be provided to provide additional support for the frame. The elongated member 17 may be attached at its ends to opposed side elongated members 16. This attachment may be by welding or securing in another suitable manner.

The frame 10 is also supported by a pair of side braces 40. These side braces 40 are illustrated in FIGS. 1, 3 and 4. These side braces form a diagonal support between the frame 14 and the ladder rail 42. Each of these pair of side disposed braces 40 have a substantially planar section 44 that is attached to its respective elongated member 16, and also has a support section 46 that is urged against the ladder rail 42. In this regard refer to the perspective view of FIG. 4 that shows the support section 46 urged against the rail 42. The entire brace 40 may be constructed of ⅛ inch thick low carbon steel. The support section 46 may be attached to a leg of the planar section such as by welding or other means of securing.

The support section 46 is formed as an open U-shaped channel 47 that rests against the rail 42. The channel 47 has side walls 48 that essentially capture the rail 42. The side walls 48 are spaced a predetermined distance so that they snugly engage with the ladder rail 42. This engagement prevents any substantial side to side motion of the step 10. The weight of the hunter upon the step also firmly engages the U-shaped channel 47 with the ladder rail 42. In connection with this engagement of the step with the ladder, refer to the perspective view of FIG. 4 which clearly shows the support section 46 engaged with the ladder rail. With braces 40 being on either side of the step, this provides a firm engagement with the ladder to provide a very stable platform for the hunter.

Reference is now made to the schematic diagrams of FIGS. 6 and 7 illustrating the tree stand at 50. This may be comprised of two separate steps 50A and 50B that are staggered one to the other. The step 50A overlaps a portion of the step 50B. The schematic diagrams of FIGS. 6 and 7 also illustrate the ladder L and the step 10 supported at a position on the ladder so that the step 10 is lower than the tree stand step 50B and also extends outwardly from the ladder, as illustrated. This arrangement provides a full 360 degree viewing by the hunter standing on the step once secured in place.

As mentioned previously, the step of the present invention is comprised of a frame 16 with a pair of elongated members extending substantially in parallel with each other and each having extending free ends 16A. In this regard reference may be made to FIGS. 3 and 4 showing the free ends 16A as well as the holding pieces 20. These holding pieces are in the form of pins that may be constructed using a hex head cap screw along with a hex female threaded standoff as previously described. In this regard refer to the standoff 22 in FIG. 3, as well as the cap screw at 21.

Now, with regard to an alternate embodiment of the present invention, reference is made to FIGS. 8 and 9. In FIGS. 8 and 9 the same reference characters are used to identify similar components. In the embodiment of FIGS. 8 and 9, rather than having the standoffs 22 fixedly secured to the free ends 16A of the elongated member 16, the standoffs 22 are secured to a short section of bar illustrated in FIGS. 8 and 9 at 60. The cap screw 21 and the standoff 22 illustrated in FIGS. 8 and 9 may be attached to the bar 60 in the same manner as previously described in connection with FIGS. 3 and 4. The bar 60 may have a rectangular or square cross section and may be constructed of a heavy metal material. The bar 60 may either be constructed of a solid piece of material or may be tubular. The outer perimeter of the bar 60 is constructed so that the bar 60 can telescopically slide within the recess 62 in the member 16.

The bar 60 is provided with at least one through hole 64 and the end 16A is provided with opposed side slots 66. FIGS. 8 and 9 show only one of the slots 66, it being understood that there is a like slot on the opposite wall defining the end 16A. FIGS. 8 and 9 also illustrate the bolt 70, nut 72 and associated washers 74. The nut 72 is preferably a lock nut that can be tightened onto the screw or bolt 70 as various positions along the length of the screw or bolt. The slot 66 is slightly elongated as illustrated in FIG. 9 in the longitudinal direction of the member 16.

Thus, in accordance with this alternate preferred construction shown in FIGS. 8 and 9, the locking pin or standoff 22 allows for a limited sliding action of the pin 22. This is advantageous in allowing for the stand to engage with different ladder rung configurations, thus essentially fitting all units that are on the market. In accordance with the present invention, the bar 60 is also preferably solid so as to greatly increase the strength of the connection at the standoff. The bar 60 may be square as illustrated of ⅝ inch solid steel material.

Thus, in accordance with the embodiment illustrated in FIGS. 8 and 9, these steel bars 60, one at each side of the stand, slide respectively into the main tubular steel frame and attach to the frame using preferably ¼ inch—20 grade 8 steel hex head screws illustrated at 70 in FIGS. 8 and 9. These screws are tightened to a relatively loose but secured fit so that the square steel bars can slide in and out by approximately ½ inch. This allows for a small amount of play so that the stand can be properly adjusted relative to any misalignment of a ladder rung on the ladder stand. FIG. 9 also illustrated in dotted outline an optional second hole 65 in the event that there may be some need for additional adjustment of the location of the bar 60. The hole 65 may be closely spaced to the hole 64.

As indicated previously, the slot 66 is elongated. The elongation of the slot 66, along with the fact that the screw or bolt 70 is not completely tightened, allows for a certain play of the bar 60 in the direction of arrow 61.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A step for use in association with a tree stand ladder, said step comprising:
    a frame that includes a plurality of elongated members that are formed into a rectangular or square form;
    a first pair of said elongated members extending substantially in parallel with each other and each having extending free ends;
    two holding pieces secured at the end of respective free ends of the pair elongated members;
    said holding pieces each extending substantially transverse to each respective elongated member and for engagement with rungs of the tree stand ladder;
    a planar platform secured to the frame to enable a person to stand on the platform;
    and a pair side braces that extend from respective elongated members to respective ladder rails to provide support for said frame and planar platform;
    said frame also including a second pair of said elongated members that extend respectively transverse to and connect with the first pair of elongated members;
    one of said second pair of elongated members has ends thereof which connect with the first pair of elongated members spaced inwardly from respective extending free ends of the first pair of said elongated members;
    the other of the second pair of elongated members is formed integrally with the first pair of elongated members by means of integrally formed corner sections;
    said holding pieces are each comprised of a pin that extends substantially transverse to each respective first pair of elongated member, that are each secured at the respective free ends of the first pair of elongated members, and that are each spaced from said one of said second pair of elongated members;
    said planar platform is formed by a metal sheet that is in the form of a steel sheet;
    said side braces each comprised of a diagonal brace having a planar section attached to respective first pair of elongated member and a support section that is urged against a ladder rail;
    said support section is formed as an open U-shaped channel that rests against the rail;

each said U-shaped channel including opposed facing sidewalls spaced apart a distance so as to capture sides of a rail so as to prevent any substantial side to side motion of the step relative to the rail.

2. The step of claim 1 wherein each of the elongated members is formed with a hollow steel box construct.

3. The step of claim 1 wherein the metal sheet has formed openings that are diamond shaped.

4. The step of claim 1 wherein each corner section is curved.

5. The step of claim 1 wherein the open U-shaped channel is also defined by a base wall that is disposed substantially orthogonal to the opposed facing sidewalls.

6. The step of claim 5 wherein the planar section has an end leg.

7. The step of claim 6 wherein the end leg extends substantially orthogonal to a planar surface of the planar section.

8. The step of claim 7 wherein the base wall of the open U-shaped channel has opposed sides including a side that forms, with the sidewalls thereof, the open U-shaped channel and an opposite side that is attached to the leg of the planar section.

9. The step of claim 1 wherein the metal sheet has a grid structure.

10. The step of claim 9 wherein the grid structure has openings therethrough.

11. The step of claim 1 including a separate bar pair of bars engageable with the free ends of the respective first pair of elongated members.

12. The step of claim 11 wherein the pin of each holding piece comprises a stand off with each respective and separate bar fixedly supporting a stand off.

13. The step of claim 12 wherein the free end of the respective first elongated members have an elongated slot for receiving a bolt for securing the bar with the elongated member in a semi-tightened manner.

\* \* \* \* \*